Nov. 8, 1938.  F. J. HANSEN  2,136,295
THROTTLE VALVE CONTROL MEANS FOR INTERNAL COMBUSTION ENGINES
Filed June 15, 1936  3 Sheets-Sheet 1
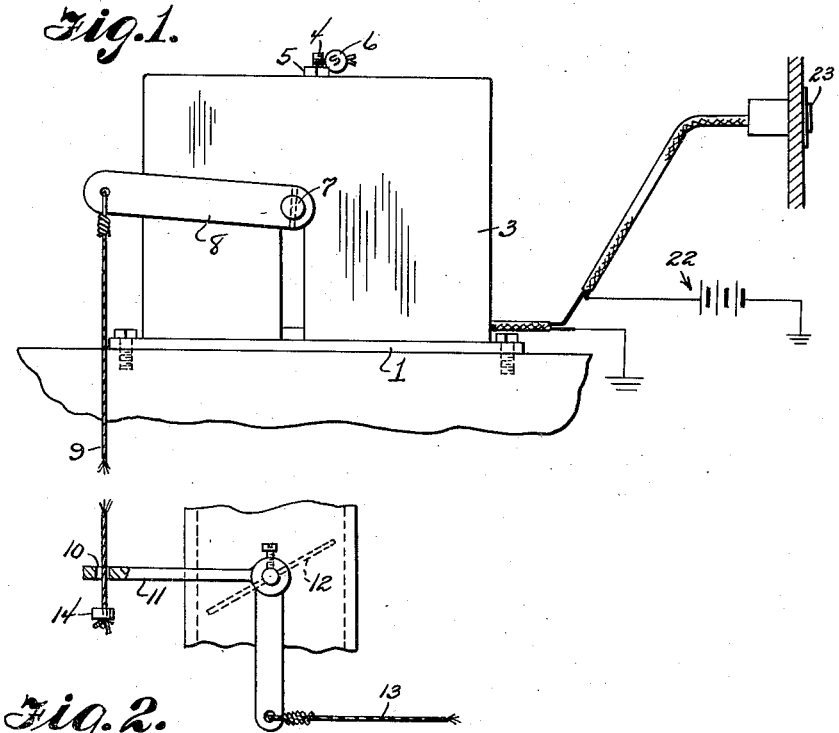
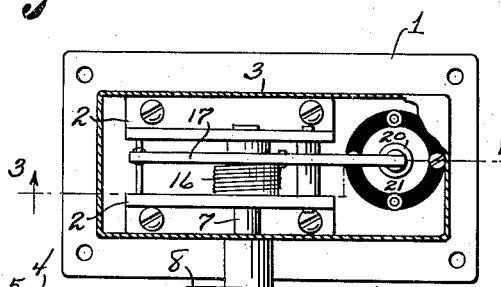
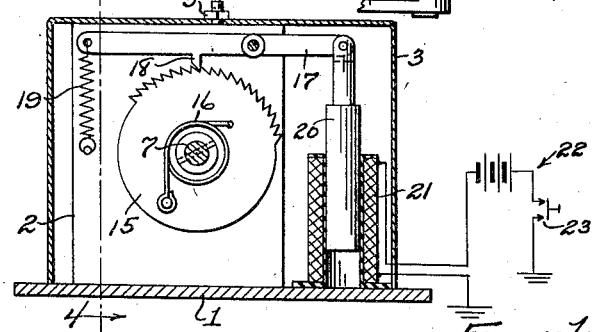
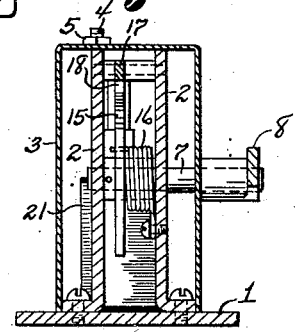
Frank J. Hansen INVENTOR
BY Victor J. Evans & Co.
ATTORNEYS Nov. 8, 1938.  F. J. HANSEN  2,136,295
THROTTLE VALVE CONTROL MEANS FOR INTERNAL COMBUSTION ENGINES
Filed June 15, 1936    3 Sheets-Sheet 2
Fig.5.
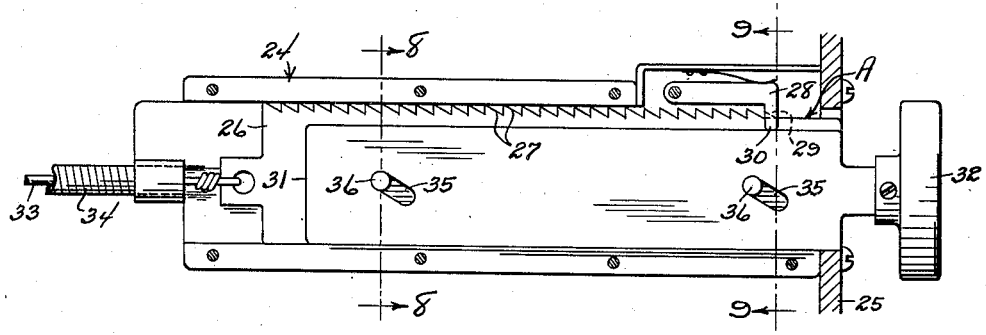
Fig.6.
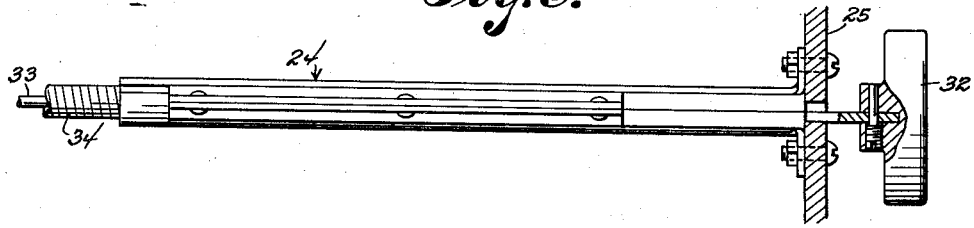
Fig.7.       Fig.8.       Fig.9.
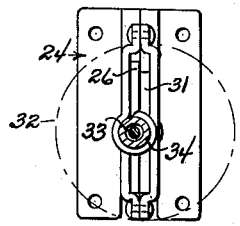 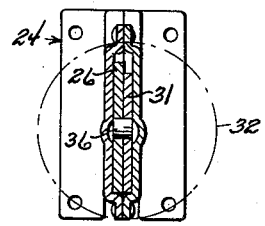 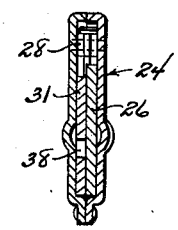
Fig.10.
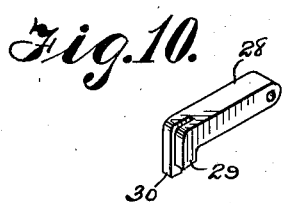
Frank J. Hansen
INVENTOR
BY Victor J. Evans & Co.
ATTORNEYS Nov. 8, 1938.  F. J. HANSEN  2,136,295

THROTTLE VALVE CONTROL MEANS FOR INTERNAL COMBUSTION ENGINES

Filed June 15, 1936  3 Sheets-Sheet 3

Frank J. Hansen
INVENTOR
BY Victor J. Evans & Co.
ATTORNEYS

Patented Nov. 8, 1938

2,136,295

UNITED STATES PATENT OFFICE 2,136,295

THROTTLE VALVE CONTROL MEANS FOR INTERNAL COMBUSTION ENGINES

Frank J. Hansen, Omaha, Nebr., assignor of one-half to James C. Valentine, Sioux City, Iowa Application June 15, 1936, Serial No. 85,367

4 Claims. (Cl. 137—139)

This invention relates to adjustable stops for controlling throttle valves of internal combustion engines and has for the primary object the provision of a simple and efficient device of this character which may be easily and quickly adapted to an engine of a motor vehicle or some other similar device, whereby the engine may be run or operated at variable speeds from idling speed to a selected or predetermined speed and which may be easily and quickly adjusted to permit the selected or predetermined speed to be increased or decreased as desired and which may be quickly rendered inoperative to permit operation of the engine up to its maximum speed in the usual manner.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating an adjustable stop constructed in accordance with my invention and showing the operative connection thereof with the throttle valve of an engine.

Figure 2 is a horizontal sectional view showing the adjustable stop.

Figure 3 is a vertical sectional view taken on the line 3—3 of Figure 2.

Figure 4 is a transverse sectional view taken on the line 4—4 of Figure 3.

Figure 5 is a fragmentary vertical sectional view showing a modified form of my invention.

Figure 6 is a plan view, partly in section, illustrating the same.

Figure 7 is an end elevation, partly in section, showing my modified form of invention.

Figure 8 is a transverse sectional view taken on the line 8—8 of Figure 5.

Figure 9 is a transverse sectional view taken on the line 9—9 of Figure 5.

Figure 10 is a perspective view illustrating a dog employed in my modified form of invention.

Figure 11:
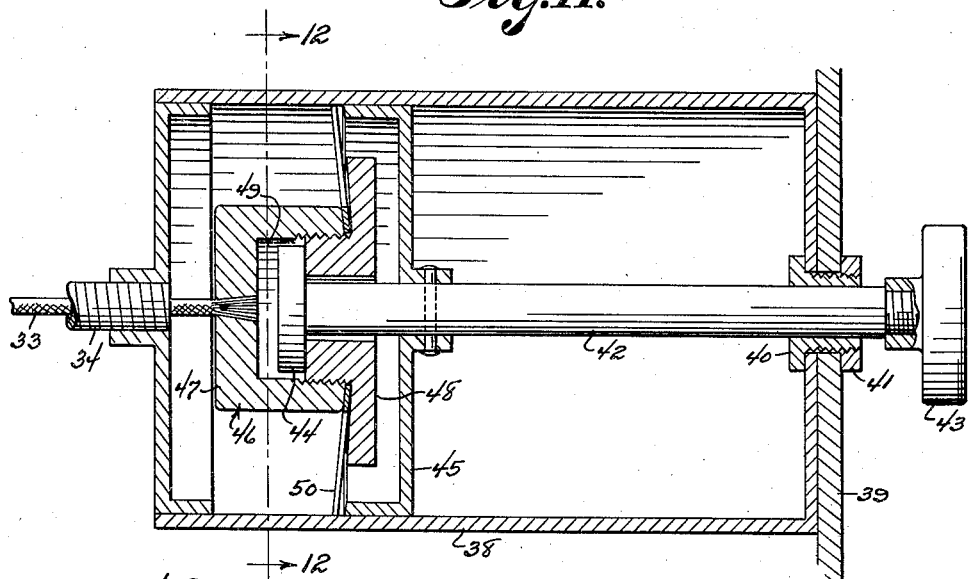
Figure 11 is a fragmentary vertical sectional view illustrating another modified form of my invention.
Figure 12:
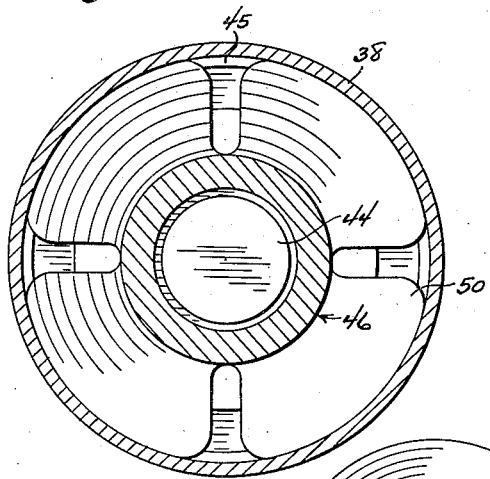
Figure 12 is a transverse sectional view taken on the line 12—12 of Figure 11.

Referring in detail to the drawings, the numeral 1 indicates a base which may be mounted on any suitable type of support and has secured thereto spaced uprights 2. A casing 3 encloses the uprights and rests upon the base and has an opening to permit a screw threaded shank 4 to extend therethrough and which forms an integral part of one of the uprights. A nut 5 is threaded on the shank and engages the casing 3 to retain the latter on the base. The shank may be provided with an opening through which extends a seal 6 to prevent unauthorized removal of the casing from the base. A shaft 7 is journaled to the uprights and extends through one wall of the casing and has secured thereto an arm 8 to which is connected one end of a flexible element 9. The flexible element 9 passes freely through an opening 10 of an arm 11. The arm 11 is secured to a throttle valve 12 of an internal combustion engine. The throttle valve 12 is of the self-closing type and is moved towards an open position through the operation of a conventional type of control, a part of which is indicated by the character 13. The free end of the flexible element 9 has secured thereto a member 14 of a diameter larger than the opening 10 of the arm 11 to prevent the flexible element 9 from being entirely disconnected from the arm 11.

A toothed plate 15 is secured to the shaft 7 and operates between the uprights. One end of a spring 16 is secured to the toothed plate while the other end of the spring is secured to one of the uprights. The convolutions of the spring surround the shaft. The spring acts to rotate the toothed plate in one direction and in a direction to move the arm 8 in the direction to bring about closing of the valve 12 or the positioning of the latter for the maintenance of the operation of the engine at idling speed.

A lever 17 is pivoted to the upright and formed integrally with the lever is a dog 18 adapted to coact with the toothed plate in securing the shaft against rotation by the influence of the spring 16. One end of the shaft 17 has connected thereto a spring 19 acting to urge the dog in engagement with the toothed plate. The other end of the lever has pivoted thereto a core 20 of a solenoid 21. The solenoid is mounted on the base and is connected in an electric circuit 22. The electric circuit is controlled by a switch or push button 23. The push button is preferably located in convenient reach of the operator of the engine.

In operation, the operator controls the speed of the engine in the usual manner through the manipulation of the control 13. When it is desired to prevent the operation of the engine beyond a predetermined speed, the operator advances the speed of the engine to the selected speed and then closes the circuit by actuating the switch 23 which energizes the solenoid 21. The energization of the solenoid brings about a disengagement of the dog 18 from the toothed plate 15 and the spring 16 acts to rotate the shaft until the member 14 abuts the arm 11. The switch 23 is then opened deenergizing the solenoid 21 and permitting the spring 19 to again engage the dog 18 with the toothed plate. The operator is then obtaining from the engine variable speeds between idling speed and the selected speed. Consequently, it will be seen that the engine cannot be accelerated or driven faster than the selected speed.

The device described is especially adaptable to an internal combustion engine for a motor vehicle wherein it is desired to prevent driving of the vehicle faster than a selected speed still being able to drive said vehicle at variable speeds between zero and the selected speed. If a speed of the engine is desired which is more than the selected speed the control mechanism may be quickly rendered inactive by closing the switch 23 to bring about the energization of the solenoid to disengage the dog 18 from the toothed plate, freeing the shaft 7 so that the operator through the control 13 may move the control valve 12 to any of its positions for obtaining any desired speed. The rendering of the adjustable stop inoperative will be desirable when it is desired to drive the motor vehicle at a speed in excess of the selected speed. For instance, the selected speed may be thirty-five miles per hour and in order to pass another vehicle it may require a speed of forty miles an hour and by simply closing the switch 23 the adjustable stop can be rendered inactive and permit the operation of the engine at a speed of forty miles an hour to pass the vehicle. The adjustable stop may be readily reset at the selected speed by the operator bringing the speed of the engine up to the selected speed and closing the switch 23 so that the spring 16 may act to bring the member 14 in engagement with the arm 11. The switch is then opened rendering the adjustable stop active in preventing the operation of the engine at a speed more than the selected speed.

While I have described this invention especially adaptable for motor vehicles, it is to be understood that it may be successfully used on internal combustion engines employed for propelling devices other than motor vehicles.

The form of the invention described is partly mechanical and partly electrical in operation. The form of my invention shown in Figures 5 to 10, inclusive, is entirely mechanical in operation and consists of a frame 24 suitably mounted on a support 25 which may be the instrument board of a motor vehicle. The frame 24 slidably supports a rack plate 26, the teeth of which are indicated by the character 27 and engaged by a pivotally mounted spring-pressed dog 28. The dog is carried by the frame and includes a portion 29 to contact the teeth and a portion 30 to contact the operating plate 31 equipped at one end with a finger piece 32. The rack plate 26 is connected to a flexible element 33 which is connected to the arm 11 by passing through the opening 10 and has the member 14 secured to its free end. The flexible element 33 operates in a flexible tube 34. The flexible tube 34 is suitably secured to the frame 24. The operating plate 31 has inclined slots 35 through which extend pins 36 secured to the rack plate. A sliding movement of the operating plate inwardly with respect to the rack plate 26 will bring about an upward movement of the operating plate due to the pins extending through the slots 35. The upward movement of the operating plate disengages the dog 28 from the teeth 27 of the rack plate. The rack plate may be slid to the right in Figure 5 by pulling on the finger piece 32 due to the dog 28 ratcheting over the teeth 27 of the rack plate. However, the dog will prevent sliding movement of the rack plate to the left in Figure 5 by contacting the teeth.

In operation, the operator increases the speed of the engine to the desired or selected speed and then pulls upon the finger piece 32 sliding the rack plate 26 to the right in Figure 5, bringing the member 14 in engagement with the arm 11. The rack plate is locked in this position by the dog engaging one of the teeth. Thus it will be seen that the engine is controlled as to speed, that is, the engine cannot be operated at a speed greater than the selected speed. Should it be desired to increase the speed of the engine faster than the selected speed the operator pushes upon the finger piece 32, imparting sliding movement to the operating plate 31. The operating plate during the sliding movement moves upwardly disengaging the dog from the tooth of the rack plate so that said rack plate may slide to the left in Figure 5, freeing the arm 11 of the control valve 12 so that the latter may be moved towards its full open position from the position previously occupied and thereby increase the speed of the engine over the selected speed.

One end of the rack plate is minus the teeth, as shown by the character A, the purpose of which is to allow the rack plate to have a limited sliding movement when the valve 12 is positioned to bring about idling speed.

Figure 13:
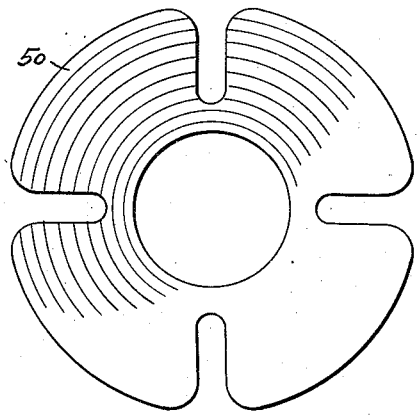
Figure 13 is a plan view illustrating a clutch plate.
Figure 14:
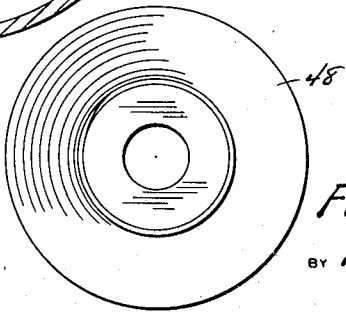
Figure 14 is a plan view illustrating a piston or plunger head for operating the clutch plate.

Referring to my modified form of invention, as shown in Figures 11 to 14, inclusive, this type of mechanical control is disclosed and consists of a cylinder 38 mounted on the instrument board 39 by a bushing 40 and a nut 41. A stem 42 extends into the cylinder by way of the bushing and has secured to its outer end a finger piece 43 and to its inner end a disc-like member 44. A clutch operating piston-like member 45 is secured to the plunger or stem 42 and is of a diameter slightly less than the internal diameter of the cylinder 38. Located in the cylinder is a head 46 consisting of sections 47 and 48 providing therebetween a limited slide space 49 in which is received the disc-like member 44 of the stem. The space 49 permits the stem to have a limited movement with respect to the head 46. Clamped between the sections of the head 46 is a clutch plate 50, the periphery of which has peripheral contact with the internal walls of the cylinder. The clutch plate is slotted inwardly from its periphery, as shown in Figure 13, and also the clutch plate is dished, the purpose of which is to dispose the clutch plate at a slight inclination when mounted on the head. The section 47 of the head has the flexible element 33 connected thereto and the flexible tube 34 is connected to one end of the cylinder. The clutch plate will permit the stem 42 to slide freely to the right in Figure 11, bringing the member 14 in engagement with the arm 11, regardless of the seating of the valve 12. A movement of the head 46 to the left in Figure 11 is prevented by the clutch plate biting against the internal walls of the cylinder. The piston-like member 45 contacts the clutch plate adjacent its periphery and to permit a movement of the head 46 to the left in Figure 11, the plunger 42 is pushed inwardly bringing force onto the clutch plate at its periphery by the piston-like member 45. This force will flex the clutch plate and bring about disengagement thereof from the cylinder so that on further movement of the plunger the head 46 may be entirely moved to the left hand end of the cylinder. In operation, after setting the throttle valve to bring about the operation of the engine at a selected speed, a pull is made on the finger piece 43 sliding the head 46 to the right in Figure 11, bringing the member 14 in engagement with the arm 11. The engine then cannot be operated faster than the selected speed due to the fact that the member 14 will prevent movement of the throttle valve beyond the predetermined position for the operation of the engine at the selected speed. Should it be desired to operate the engine faster than the selected speed, the finger piece 43 is pressed upon, freeing the clutch plate from the cylinder so that the head 46 may be moved to the left in Figure 11, readjusting the position of the member 14 to permit the maximum movement of the control valve 12.

Having described the invention, I claim:

1. A control means for a throttle valve of an internal combustion engine comprising a mounting, a shaft journaled on said mounting, an arm secured to said shaft, means connecting said arm to a throttle valve of an engine and adapted to permit free closing of the valve and to variably limit the opening of the valve, means acting to rotate the shaft in a direction to close the valve, means for releasably securing the shaft against rotation by the action of said second-named means, a closure for said second and third-named means and releasably secured to the mounting, and a seal to prevent unauthorized removal of said closure.

2. A control means for a throttle valve of an internal combustion engine comprising a mounting, a shaft journaled on said mounting, an arm secured to said shaft, flexible means connecting said arm to a throttle valve and engine and adapted to permit free closing of the valve and to variably limit the opening of the valve, a spring acting on the shaft to rotate the latter in a direction to close the valve, and means for releasably securing the shaft against rotation by the action of said spring.

3. A control means for a throttle valve of an internal combustion engine comprising a mounting, a shaft journaled on said mounting, an arm secured to said shaft, flexible means connecting said arm to a throttle valve and engine and adapted to permit free closing of the valve and to variably limit the opening of the valve, a spring acting on the shaft to rotate the latter in a direction to close the valve, a toothed plate secured to the shaft, a lever pivoted to the mounting, a dog carried by the lever and moved into and out of engagement with the toothed plate, a spring acting on said lever to urge the latter in a position to engage the dog with the toothed plate, and means connected to said lever to disengage the dog from the toothed plate.

4. A control means for a throttle valve of an internal combustion engine comprising a mounting, a shaft journaled on said mounting, an arm secured to said shaft, flexible means connecting said arm to a throttle valve and engine and adapted to permit free closing of the valve and to variably limit the opening of the valve, a spring acting on the shaft to rotate the latter in a direction to close the valve, a toothed plate secured to the shaft, a lever pivoted to the mounting, a dog carried by the lever and moved into and out of engagement with the toothed plate, a spring acting on said lever to urge the latter in a position to engage the dog with the toothed plate, and a manually controlled electrical means connected to said lever for disengaging the dog from the toothed plate.

FRANK J. HANSEN.